United States Patent
Kawanami

(10) Patent No.: US 8,111,313 B2
(45) Date of Patent: Feb. 7, 2012

(54) IMAGE SENSOR DRIVING UNIT AND IMAGING APPARATUS

(75) Inventor: Naoto Kawanami, Saitama (JP)

(73) Assignee: Pentax Ricoh Imaging Company, Ltd., Tokyo (JP)

( * ) Notice: Subject to any disclaimer, the term of this patent is extended or adjusted under 35 U.S.C. 154(b) by 348 days.

(21) Appl. No.: 12/558,644

(22) Filed: Sep. 14, 2009

(65) Prior Publication Data

US 2010/0066887 A1   Mar. 18, 2010

(30) Foreign Application Priority Data

Sep. 18, 2008   (JP) .................................. 2008-239856

(51) Int. Cl.
H04N 5/335 (2011.01)
(52) U.S. Cl. ........ 348/312; 348/314; 348/320; 348/296; 348/297; 348/311
(58) Field of Classification Search .......... 348/302–311, 348/241, 243, 221.1, 312, 314, 320, 296, 348/297
See application file for complete search history.

(56) References Cited

U.S. PATENT DOCUMENTS

| | | | |
|---|---|---|---|
| 5,463,421 A * | 10/1995 | Deguchi et al. | 348/296 |
| 7,499,080 B2 * | 3/2009 | Hattori et al. | 348/220.1 |
| 2009/0149705 A1 | 6/2009 | Tani et al. | |
| 2009/0231709 A1 | 9/2009 | Nomura et al. | |
| 2010/0066885 A1 * | 3/2010 | Kawanami | 348/311 |
| 2010/0091165 A1 * | 4/2010 | Kawanami | 348/311 |

FOREIGN PATENT DOCUMENTS

| JP | 4-356879 | 12/1992 |
|---|---|---|
| JP | 06121235 A * | 4/1994 |

OTHER PUBLICATIONS

English language Abstract of JP 4-356879, Dec. 10, 1992.
U.S. Appl. No. 12/546,931 to Kawanami, which was filed Aug. 25, 2009.
U.S. Appl. No. 12/571,697 to Kawanami, which was filed Oct. 1, 2009.

* cited by examiner

*Primary Examiner* — Lin Ye
*Assistant Examiner* — Marly Camargo
(74) *Attorney, Agent, or Firm* — Greenblum & Bernstein, P.L.C.

(57) ABSTRACT

An image sensor driving unit, comprising a first controller, a second controller and a third controller, is provided. The image sensor driving unit drives an image sensor to carry out the capture of an image. The capture is carried out by ordering pixels to generate signal charges and the charge-transfer channel to transfer the signal charges. The first controller orders the image sensor to carry out a rapid discharge operation before the charge-transfer channel transfers the signal charges. The second controller controls the first controller to order the image sensor to carry out the rapid discharge operation when light is made incident for capture after the first capture with the image sensor operating in continuous photographing mode. The third controller decreases the discharge number for capture after the first capture.

9 Claims, 7 Drawing Sheets

IMAGE SENSOR DRIVING UNIT AND IMAGING APPARATUS

BACKGROUND OF THE INVENTION

1. Field of the Invention

The present invention relates to an image sensor driving unit that orders an image sensor to rapidly discharge an unnecessary electrical charge generated by a charge-transfer channel, such as a CCD, before a photographing operation.

2. Description of the Related Art

Various kinds of image sensors that generate an image signal corresponding to an optical image of a subject are known. Among the various kinds of image sensors, a CCD image sensor is commonly used owing to its adjustable size, relatively high S/N ratio, sensitivity, and various other desirable attributes.

A CCD image sensor outputs pixel signals according to the amount of light received by the pixels by ordering a vertical CCD to receive signal charges generated by a plurality of pixels separately, by ordering the vertical CCD to transfer the signal charges to a horizontal CCD, and by ordering the horizontal CCD to transfer the signal charges to an output amplifier.

The vertical CCD happens to store the electrical charge which the vertical CCD generates itself when light is leaked to the vertical CCD, and from an electrical charge left upon transferring an electrical charge exceeding the transferring capacity, from an electrical charge leaked from a pixel, and so on. Such an electrical charge becomes noise in a signal charge, and should be discharged to display an accurate image.

Japanese Unexamined Patent Publication No. H04-356879 discloses the rapid discharge of electrical charges that remain in the vertical CCD before the vertical CCD receives and transfers signal charges from pixels.

The influence of noise can be reduced by the rapid discharge. However, the time required to discharge electrical charges from the vertical CCD is added to the time to complete a photographing operation from depressing a release button. Accordingly, the entire time to complete the photographing operation is undesirably prolonged. Especially in the case of continuous photographing, it is desirable to increase the amount of photographing per a certain time by completing the photographing operation rapidly.

SUMMARY OF THE INVENTION

Therefore, an object of the present invention is to provide an image sensor driving unit that shortens the time it takes to complete a photographing operation by discharging an electrical charge stored in a charge-transfer channel, such as a CCD.

According to the present invention, an image sensor driving unit, comprising a first controller, a second controller, and a third controller, is provided. The image sensor driving unit drives an image sensor to carry out a capture of an image. The image sensor has a plurality of pixels and a charge-transfer channel. The pixels generate signal charges according to amounts of received light. The charge-transfer channel reads out the signal charges from the pixels and transfers the signal charges. The capture is carried out by ordering the pixels to generate the signal charges and the charge-transfer channel to transfer the signal charges. The first controller orders the image sensor to carry out a rapid discharge operation before the charge-transfer channel reads out and transfers the signal charges. An electrical charge remaining in the charge-transfer channel is discharged in the rapid discharge operation. The second controller controls the first controller to order the image sensor to carry out the rapid discharge operation when light is made incident on the pixels for the capture after the first capture with the image sensor operating in continuous photographing mode. The third controller varies a discharge number. The discharge number is the number of the rapid discharge operations to be carried out. The third controller decreases the discharge number for the capture after the first capture from the discharge number for the first capture.

According to the present invention, an imaging apparatus, comprising an image sensor, a first controller, a second controller, and a third controller, is provided. The image sensor has a plurality of pixels and a charge-transfer channel. The pixels generate signal charges according to amounts of received light. The charge-transfer channel reads out the signal charges from the pixels and transfers the signal charges. The image sensor carries out a capture of an image. The capture is carried out by ordering the pixels to generate the signal charges and the charge-transfer channel to transfer the signal charges. The first controller orders the image sensor to carry out a rapid discharge operation before the charge-transfer channel reads out and transfers the signal charges. An electrical charge remaining in the charge-transfer channel is discharged in the rapid discharge operation. The second controller controls the first controller to order the image sensor to carry out the rapid discharge operation when light is made incident on the pixels for the capture after the first capture with the image sensor operating in continuous photographing mode. The third controller varies a discharge number. The discharge number is the number of the rapid discharge operations to be carried out. The third controller decreases the discharge number for the capture after the first capture from the discharge number for the first capture.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
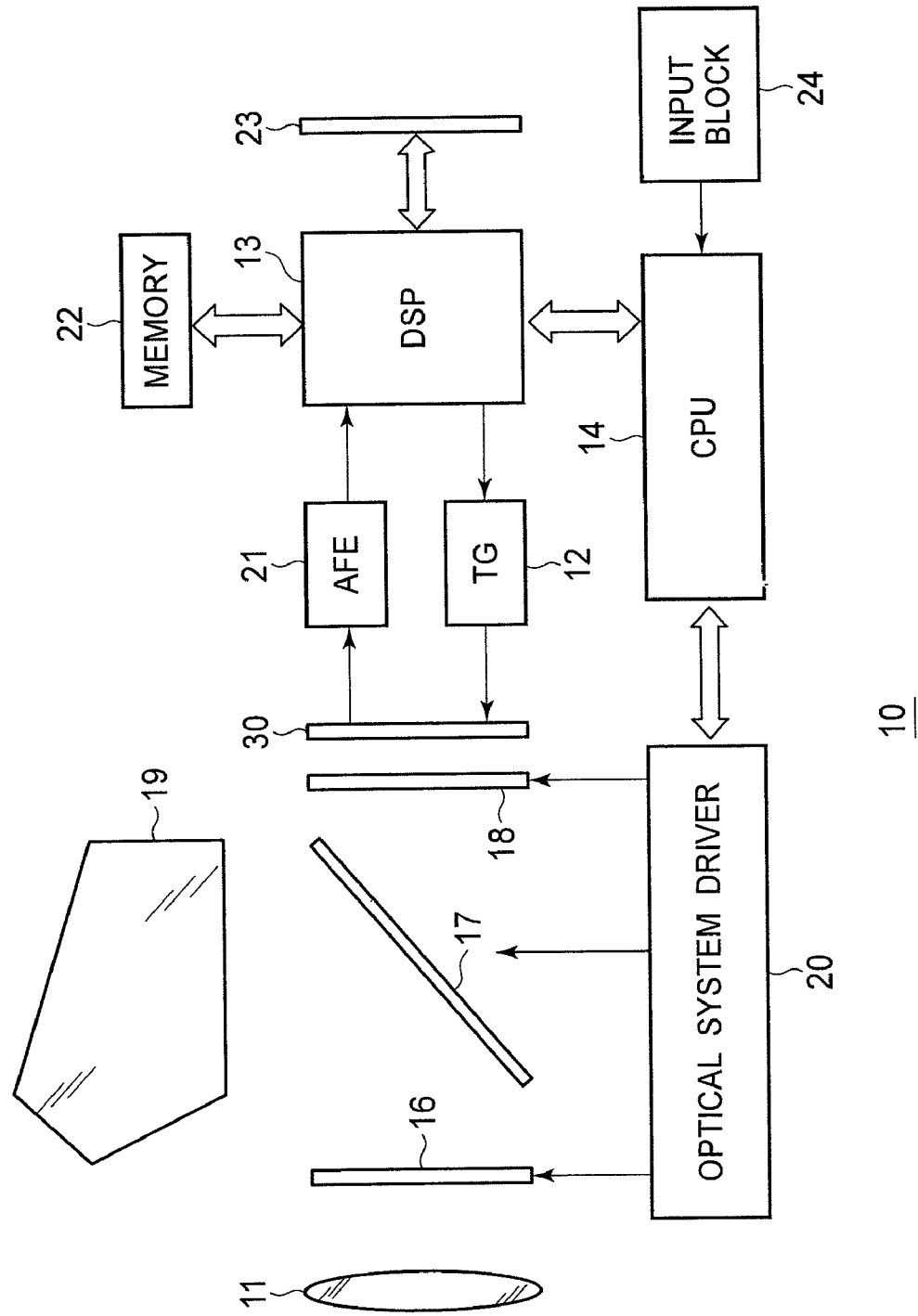
FIG. 1 is a block diagram showing the internal structure of a single-lens reflex camera having the image sensor driving unit of the embodiments of the present invention.

The present invention is described below with reference to the embodiment shown in the drawings.

In FIG. 1, the single-lens reflex camera 10 comprises a photographic optical system 11, an image sensor 30, a timing generator (TG) 12 (signal generator), a digital signal processor (DSP) 13, a CPU 14, and other components.

The photographic optical system 11 comprises a plurality of lenses, including a focus lens (not depicted) and a zoom lens (not depicted). The image sensor 30 is arranged on the optical axis of the photographic optical system 11 so that the light-receiving surface of the image sensor 30 is perpendicular to the optical axis. The photographic optical system 11 enables an optical image of a subject to be in focus on the light-receiving surface.

A diaphragm 16, a mirror 17, and a shutter 18 are positioned between the photographic optical system 11 and the image sensor 30. By varying the size of the aperture of the diaphragm 16, the amount of light incident on the image sensor 30 may be adjusted. In ready mode for photographing, the mirror 17 intersects the optical axis, and an optical image is reflected by the mirror 17 to a pentaprism 19 and transmitted to a viewfinder (not depicted). Upon a release operation, the mirror 17 is turned upward, and the optical image arrives at the shutter 18. By opening and closing the shutter, light arriving at the image sensor 30 may be controlled.

The diaphragm 16, the mirror 17, and the shutter 18 are driven by the optical system driver 20. The optical system driver 20 drives each of the components on the basis of the control of the CPU 14.

The TG 12 drives the image sensor 30 to generate an image signal corresponding to the optical image reaching the light-receiving surface. The TG 12 is controlled by the DSP 13. The generated image signal is transmitted to the DSP 13 via an AFE 21.

The AFE 21 carries out correlated double sampling processing, auto gain control processing, and analog-to-digital conversion processing on the received image signal. The DSP 13 carries out predetermined signal processing on the received image signal. The image signal, having undergone predetermined signal processing, is stored in a memory 22 or transmitted to an LCD 23, where a captured image is displayed.

The DSP 13 is connected to the CPU 14. The DSP 13 drives the TG 12, carries out predetermined signal processing on the image signal, stores the image signal in the memory 22, and conducts other operations on the basis of orders from the CPU 14.

Furthermore, the CPU 14 controls the operations of each component of the single-lens reflex camera 10. The CPU 14 is connected to an input block 24 that comprises a release button (not depicted), a power button (not depicted), a multifunctional cross key (not depicted), and so on. The CPU 14 controls the components according to various commands input by a user to the input block 24.

Next, the operation of the image sensor 30 upon the release operation, and the structure of the image sensor 30 are explained.

Figure 2:
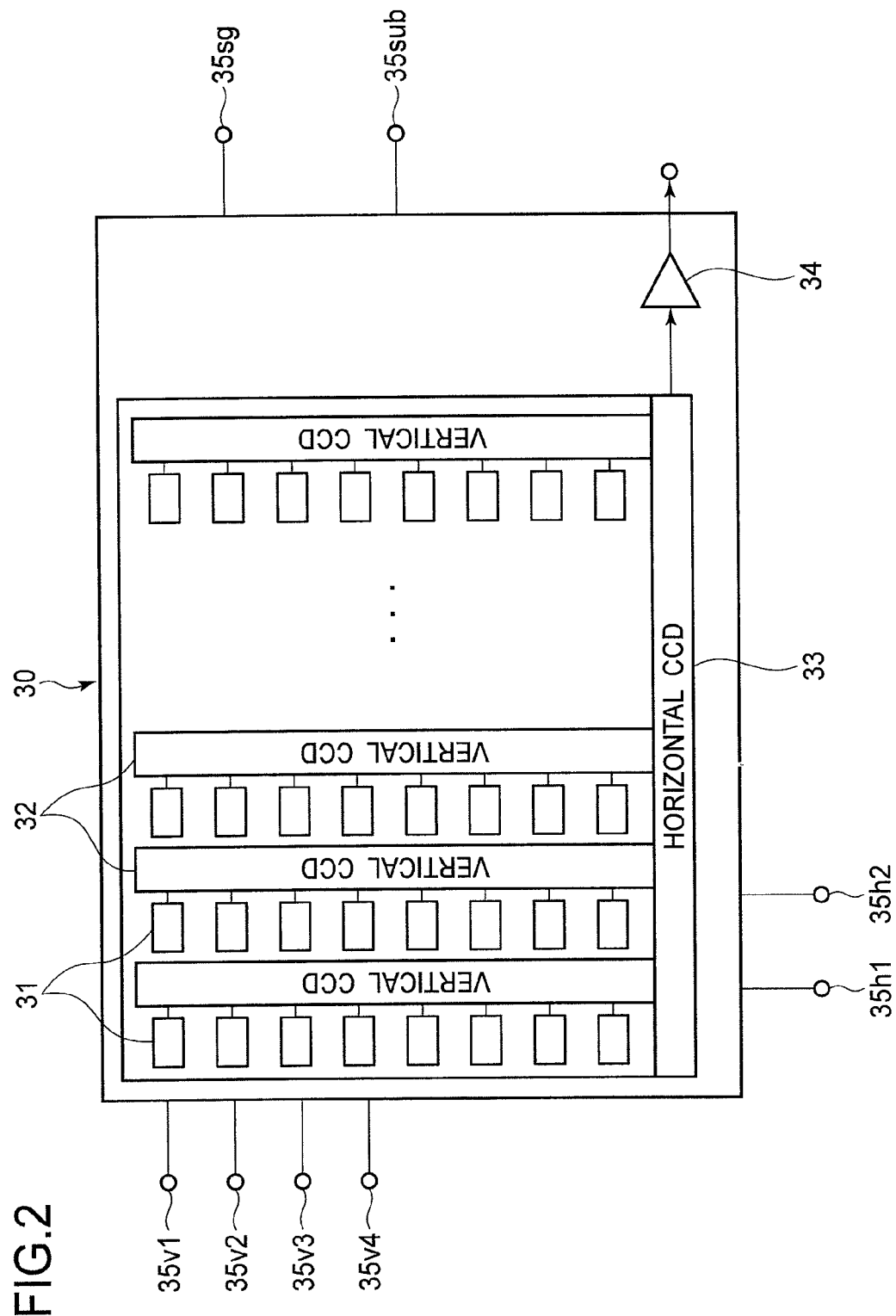
FIG. 2 is a schematic diagram showing the structure of the image sensor.

The image sensor 30 is a CCD image sensor. As shown in FIG. 2, the image sensor 30 comprises pixels 31, vertical CCDs 32, a horizontal CCD 33, an output amplifier 34, and other components.

A plurality of pixels 31 are arranged on the light-receiving surface in two dimensions. The vertical CCDs 32 are arranged in each column of the arranged pixels 31. All the pixels 31 are connected to their respective adjacent vertical CCD 32. The horizontal CCD 33 is arranged at the lower end of the vertical CCDs 32. All the vertical CCDs 32 are connected to the horizontal CCD 33. One end of the horizontal CCD 33 is connected to the output amplifier 34.

Each pixel 31 generates and accumulates a signal charge corresponding to the amount of light received. A substrate (not depicted) where the pixels 31 are arranged is connected to an electronic shutter terminal 35sub. When an electronic shutter pulse, hereinafter referred to as ΦSUB, is input to the electronic shutter terminal 35sub, an accumulated electrical charge is discharged from all the pixels 31. In addition, a sensor gate (not depicted) is arranged between the pixels 31 and the vertical CCDs 32. The sensor gate comprises a sensor gate terminal 35sg, hereinafter referred to as SG terminal. When an SG pulse, hereinafter referred to as ΦSG, is input to the SG terminal 35sg, the accumulated signal charge in each pixel is output to the vertical CCDs 32.

Figure 3:
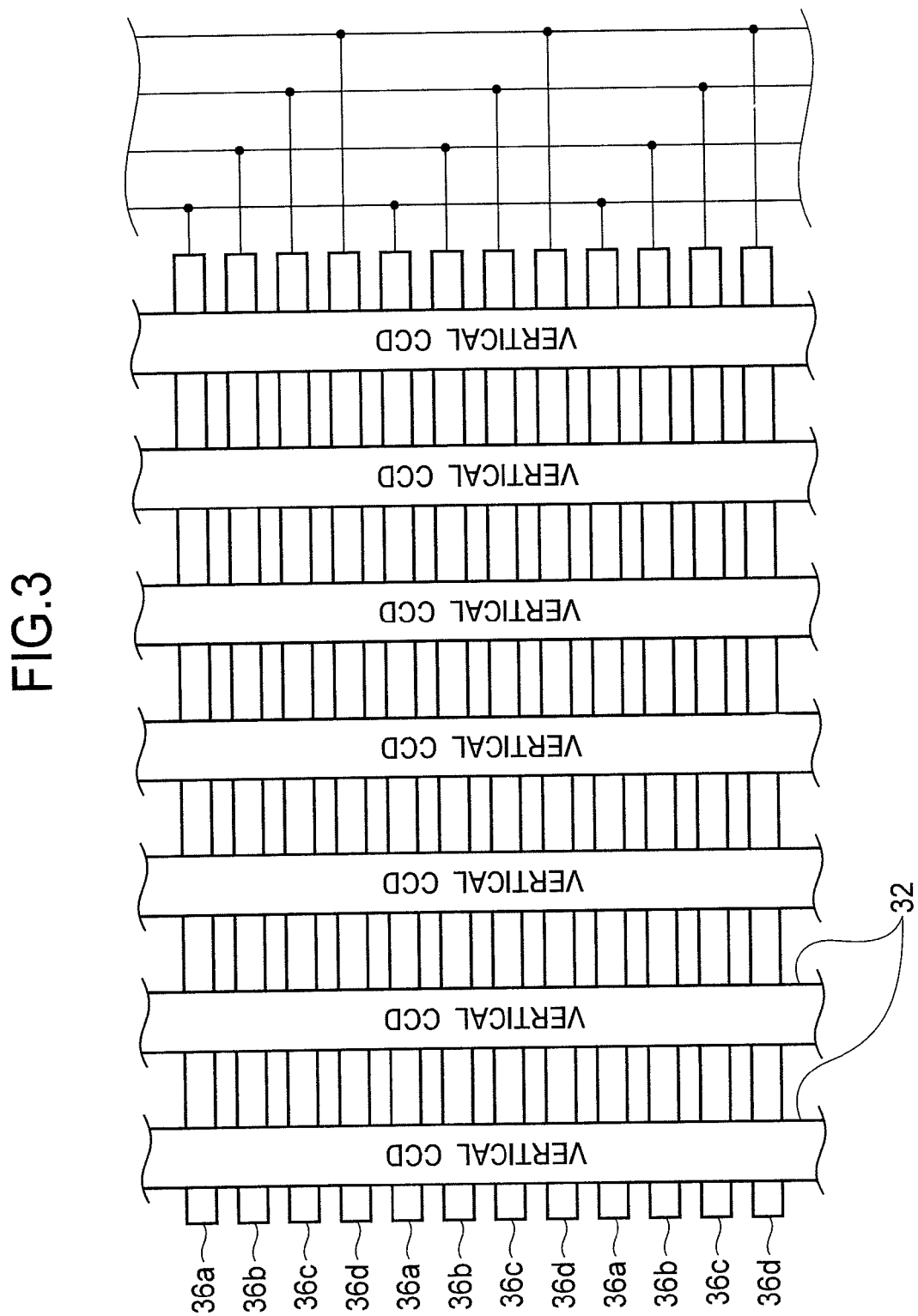
FIG. 3 is a deployment diagram showing the first-fourth electrodes.

As shown in FIG. 3, first, second, third, and fourth electrodes 36a, 36b, 36c, and 36d are arranged repeatedly in order along the column direction of the vertical CCDs 32. In addition, the first, second, third, and fourth electrodes 36a, 36b, 36c, and 36d are connected to first, second, third, and fourth vertical transfer terminals 35v1, 35v2, 35v3, and 35v4 (see FIG. 2), respectively. By inputting vertical transfer pulses, hereinafter referred to as ΦV, to the first through fourth electrodes 36a-36d while shifting their phases, the electrical charge stored in the vertical CCDs 32 is transferred to the horizontal CCD 33.

The speed at which the vertical CCDs 32 transfer an electrical charge varies in proportion to the frequency of ΦV. The frequency of ΦV is adjusted to the first frequency that is predetermined so that the signal charges can be transferred when the signal charges should be transferred, without the transfer error. The frequency of ΦV is adjusted to the second frequency, which is predetermined to be greater than the first frequency, when a rapid discharge is to be carried out.

The fifth and sixth electrodes (not depicted) are arranged repeatedly in order along the row direction of the horizontal CCD 33. In addition, the fifth and sixth electrodes are connected to first and second horizontal transfer terminals 35h1 and 35h2 (see FIG. 2), respectively. By inputting horizontal transfer pulses, hereinafter referred to as ΦH, to the fifth and sixth electrodes while shifting their phase, the electronic charge received by the horizontal CCD 33 is transferred to the output amplifier 34.

ΦSUB, ΦSG, ΦV, and ΦH are generated by the TG 12 and input to their respective terminals.

The output amplifier 34 comprises a capacitor (not depicted), that converts a received signal charge into a signal voltage, and outputs the converted signal voltage.

Figure 4:
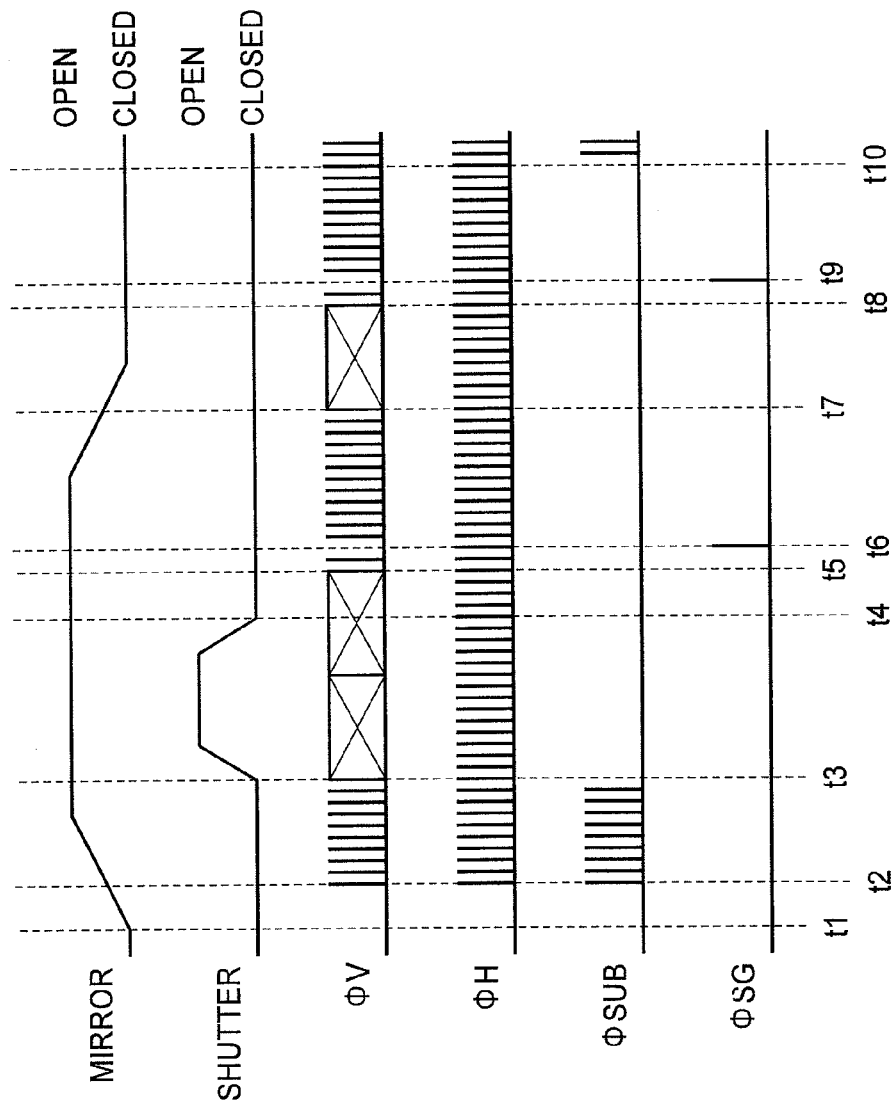
FIG. 4 is a timing chart illustrating the release operation in the single photographing mode.

The single-lens reflex camera 10 has single and continuous photographing modes. Release operations in the single and continuous photographing modes are explained using FIGS. 4 and 5.

In the single photographing mode, a single photograph is taken by fully depressing the release button, and one frame of an image signal is generated. In the continuous photographing mode, a plurality of sequential photographs is taken automatically upon fully-depressing the release button, and a plurality of frames of image signals is generated.

The CPU 14 commences the single release control, which is a sequential control, when the fully depressed release button is detected.

At time t1 after detection of full depression of the release button, the mirror 17 is turned upward.

At time t2 following time t1, the input of ΦV of the first frequency to the first to fourth vertical transfer terminals 35v1-35v4, the input of ΦH to the first and second horizontal transfer terminals 35h1 and 35h2, and the input of ΦSUB to the electrical shutter terminal 35sub commence. Then, electrical charges remaining in the vertical CCDs 32, the horizontal CCD 33, and the pixels 31 are discharged.

At time t3, the input of ΦSUB is suspended and all the pixels 31 become capable of accumulating signal charges. In addition, at time t3, the shutter 18 is opened and the exposure of an optical image to the image sensor 30 commences. At time t4, after a set exposure time has elapsed since time t3, the shutter 18 is closed and the exposure is completed.

As described later, the image sensor 30 is driven with an interlace scan. And the signal charges generated in one exposure are read out in two separate field periods, which are an even field period and an odd field period. During the even field period, the signal charges generated by the pixels 31 arranged in the even rows are read out from the image sensor 30. During the odd field period which follows the even field period, the signal charges generated by the pixels 31 arranged in the odd rows are read out from the image sensor 30.

Before reading out the signal charges during the even field period, the rapid discharge from the vertical CCDs 32 is carried out. At time t3, the frequency of ΦV is changed to the second frequency, and then electrical charges stored in the vertical CCDs 32 are rapidly discharged.

An electrical charge can be stored in any location of the vertical CCDs 32. A single rapid discharge operation is carried out by transferring the electrical charges stored in each location to the horizontal CCD 33, in order from the nearest to the farthest locations from the horizontal CCD 33.

Before reading out the signal charges during the odd field period, two rapid discharge operations are carried out. At time t5 when the second rapid discharge is completed, the frequency of ΦV is changed to the first frequency.

The time it takes to carry out two rapid discharge operations from the vertical CCDs 32 (i.e. time t3-time t5) is constant because the second frequency is predetermined. On the other hand, the period for opening the shutter 18 varies. Accordingly, the period for two rapid discharge operations happens to be shorter than that for opening the shutter 18. If the period required to carry out two rapid discharge operations is shorter than that for opening the shutter 18, the rapid discharge continues until the shutter 18 is closed, even if two rapid discharge operations have been completed.

If the exposure time is long, two rapid discharge operations can be carried out after the exposure. It is preferable to carry out the rapid discharge from the vertical CCDs 32 until just before starting the transfer of the signal charges. However, the continuous rapid discharge carried out during a long exposure causes power consumption to increase. In addition, in a long exposure a high speed is generally not required for a release operation. Accordingly, the rapid discharge operation during the exposure time can be suspended on the basis of the Tv value, and the rapid discharge operation can be carried out after exposure, as described above.

After completion of the rapid discharge operation from the vertical CCDs 32, ΦSG is input to the sensor gate terminal 35sg (see time t6). In addition, ΦV, which is adjusted so that the vertical CCDs 32 read out the signal charges accumulated in the pixels arranged in the even rows, is input to the first through fourth vertical transfer terminals 35v1-35v4. By inputting ΦSG and ΦV described above, the signal charges generated by and accumulated in the pixels 31 of the even rows during the period from time t3 to time t4 are read out by the vertical CCDs 32.

The frequency of ΦV is changed again to the first frequency after reading out the signal charges. By changing the frequency of ΦV to the first frequency, signal charges can be transferred to the horizontal CCD 33 without transfer error.

When the transfer of the signal charges in all the pixels 31 in the even rows by the vertical CCDs 32 and the horizontal CCD 33 is completed, reading out from the even field finishes (see time t7). After finishing the reading out from the even field, the frequency of ΦV is changed again to the second frequency, and electrical charges stored in the vertical CCDs 32 are rapidly discharged (see the period from time t7 to time t8).

Unlike reading the signal charges from the even field, only a single rapid discharge operation is carried out before reading out the signal charges from the odd field. At time t8, when the single rapid discharge operation is completed, the frequency of ΦV is changed to the first frequency.

After completion of the rapid discharge from the vertical CCDs 32, ΦSG is input to the sensor gate terminal 35sg (see time t9). In addition, ΦV, which is adjusted so that the vertical CCDs 32 read out the signal charges accumulated in the pixels arranged in the odd rows, is input to the first-fourth vertical transfer terminals 35v1 through 35v4. By inputting ΦSG and ΦV described above, the signal charges generated by and accumulated in the pixels 31 of the odd rows during the period from time t3 to time t4 are read out by the vertical CCDs 32.

When the transfer of the signal charges in all the pixels 31 in the odd rows by the vertical CCDs 32 and the horizontal CCD 33 is completed, reading out from the odd field finishes (see time t10). Then, by generating and reading out one frame of an image signal, one capture of an image is completed. After completing the capture of an image, electrical charges accumulated by the pixels 31 are discharged until the next single release control is started by inputting ΦSUB to the electrical shutter terminal 35sub again.

Next, the release operation in the continuous photographing mode is explained. As in the single photographing mode, the CPU 14 commences the continuous release control, which is also a sequential control, when the fully depressed release button is detected.

Figure 5:
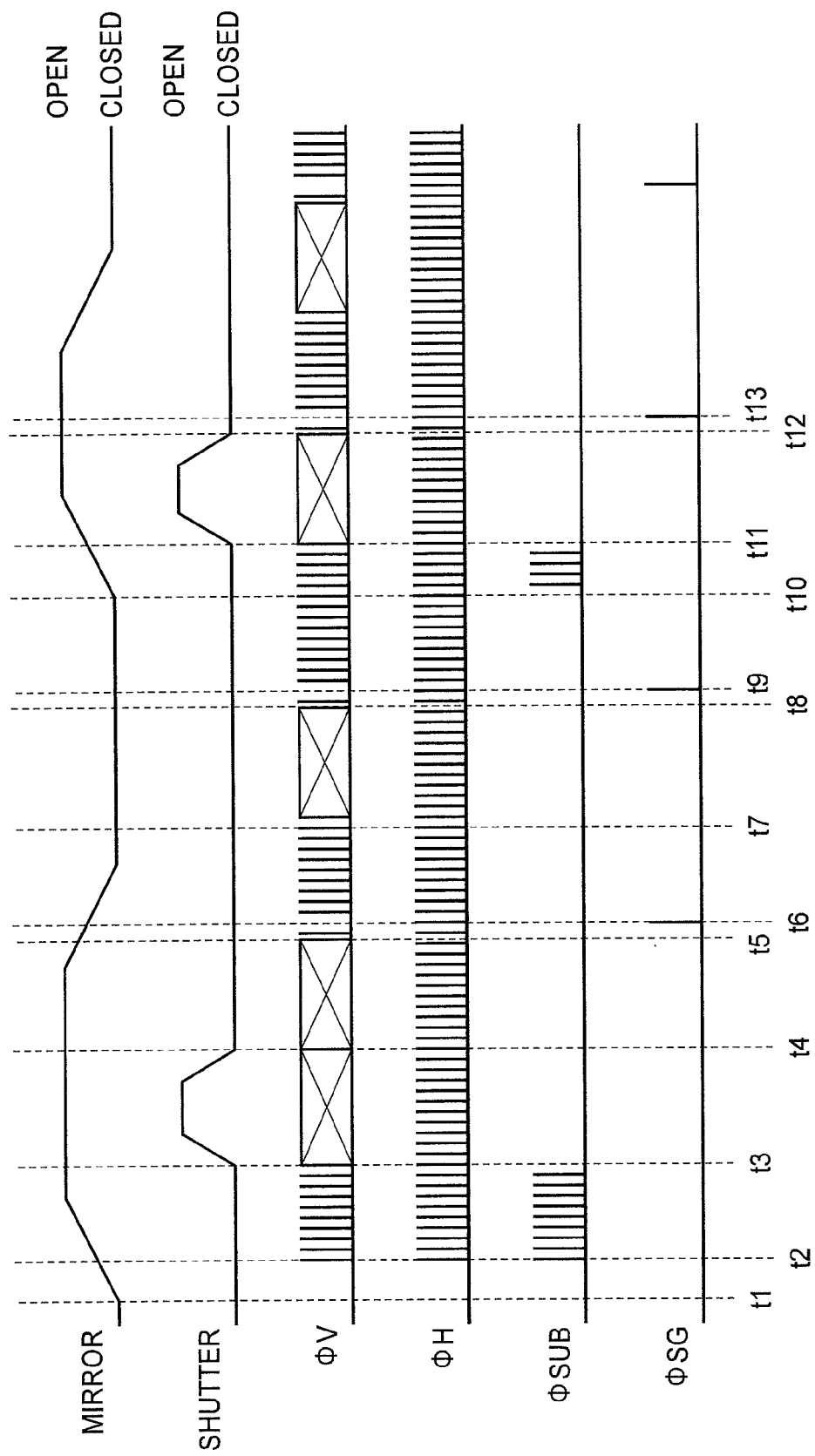
FIG. 5 is a timing chart illustrating the release operation in the continuous photographing mode.

In the continuous release control, the same operations as in the single photographing mode are carried out at the same time for the first capture of an image (i.e. generating and reading out the first frame of an image signal) (see time t1-time t10 in FIG. 5).

After the first capture of an image (time t10), by inputting ΦSUB to the electrical shutter terminal 35sub, electrical charges accumulated by the pixels 31 are discharged.

After a predetermined discharge period elapses from the beginning of the electrical charges, a second capture of an image can be started. At time t11, the input of ΦSUB is suspended, and all the pixels 31 become capable of accumulating signal charges.

In addition, at time t11, the shutter 18 is opened and the second exposure of an optical image to the image sensor 30 commences. At time t12, after a set exposure time passes from time t11, the shutter 18 is closed and the exposure is completed.

In addition, at time t11, the frequency of ΦV is changed to the second frequency, and electrical charges stored in the vertical CCDs 32 are rapidly discharged. Unlike the first exposure, a rapid discharge operation is carried out one time, as a rule, for the second capture of an image before reading out the signal charges during the even field period. If the exposure is not completed after one rapid discharge operation, the rapid discharge continues until the exposure is completed.

At time t12, when the exposure and the rapid discharge are completed, the frequency of ΦV is changed to the first frequency. After completion of the rapid discharge, ΦSG is input to the sensor gate terminal 35sg (see time t13).

Thereafter, by carrying out the same operations that were conducted during the period from time t6 to time t10 for the first capture of an image, the second frame of an image signal is generated and read out. In addition, while the release button remains fully depressed the subsequent frames of image signals are generated and read out, similar to the generating and reading out the second frame of an image signal.

Figure 6:
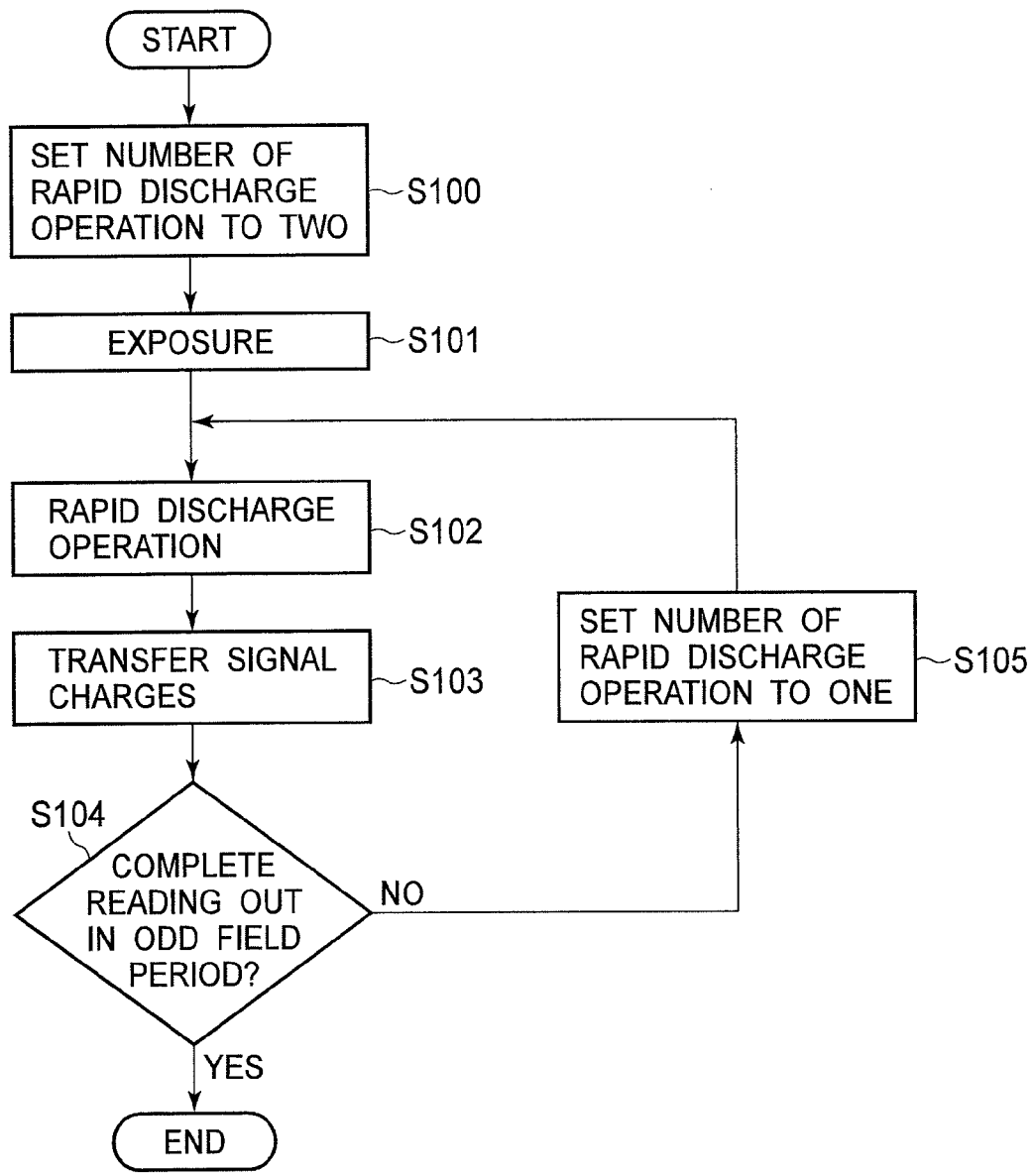
FIG. 6 is a flowchart illustrating the process for the single release control carried out by the CPU.

Next, the single release control carried out by the CPU 14 is explained below using the flowchart of FIG. 6. The single release control commences when the CPU 14 detects the fully depressed release button.

At step S100, the CPU 14 sets the number of the rapid discharge operation from the vertical CCDs 32 to two. After the number has been set, the process proceeds to step S101.

At step S101, exposure of the light-receiving surface commences. The CPU 14 orders the optical system driver 20 to turn the mirror 17 upward and to open the shutter 18 for the duration of the set exposure time. After completion of the exposure, the process proceeds to step S102.

At step S102, the CPU 14 orders the TG 12 to set the frequency of ΦV to the second frequency. The CPU 14 also orders the TG 12 to carry out the rapid discharge operations from the vertical CCDs 32 for the number of times that was set at step S100. After completion of the rapid discharge operation, the process proceeds to step S103.

At step S103, the signal charges generated and accumulated by the pixels 31 in step S101 are transferred to the output amplifier 34. As described above, the CPU 14 controls the TG 12 so that the vertical CCDs 32 read out the signal charges, the vertical CCDs 32 transfer the signal charges to the horizontal CCD 33 by changing the frequency of ΦV to the first frequency, and the horizontal CCD 33 transfers the signal charges to the output amplifier 34. After completion of the transfer of the signal charges to the output amplifier 34, the process proceeds to step S104.

At step S104, the CPU 14 determines whether or not the reading of the signal charges from the odd field has been completed. If the reading from the odd field has not been completed, the process proceeds to step S105. (0064)

At step S105, the CPU sets the number of the rapid discharge operation from the vertical CCDs 32 to one. After the number has been set, the process returns to step S102.

If the reading from the odd field is completed, the single release control terminates.

Figure 7:
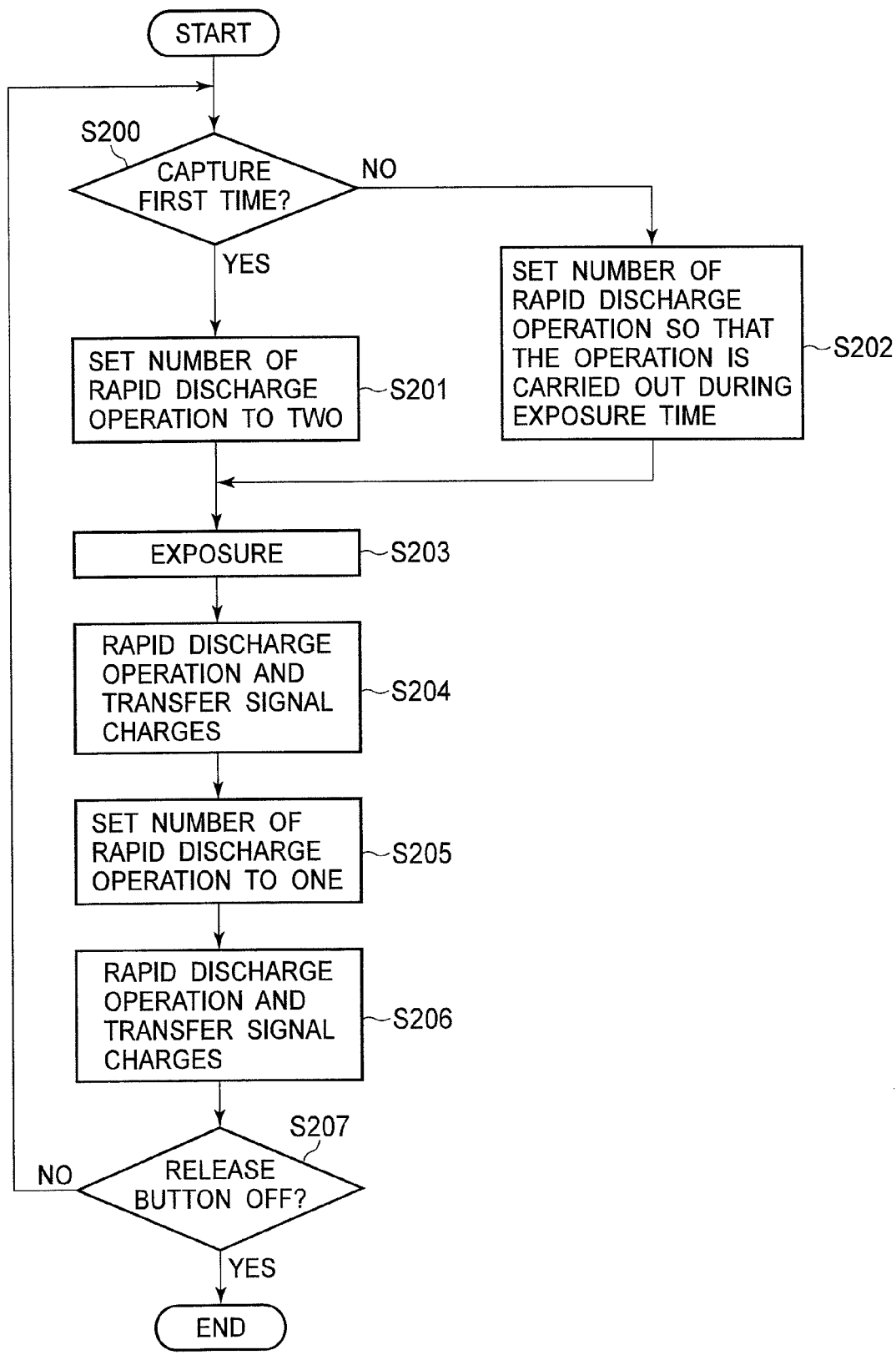
FIG. 7 is a flowchart illustrating the process for the continuous release control carried out by the CPU.

Next, the continuous release control carried out by the CPU 14 is explained below using the flowchart of FIG. 7. The continuous release control commences when the CPU 14 detects the fully depressed release button.

At step S200, the CPU 14 determines whether or not it is the first time the capture of an image is to be carried out. If it is the first time for the capture of an image, the process proceeds to step S201. If it is not the first time for the capture of an image, the process proceeds to step S202.

At step S201, the CPU 14 sets the number of the rapid discharge operation from the vertical CCDs 32 to two. At step S202, the CPU 14 sets the number of the rapid discharge operation from the vertical CCDs 32 to the number of rapid discharge operations that can be carried out during the determined exposure time. After the number has been set at step S201 or S202, the process proceeds to step S203.

At step S203, the exposure of the light-receiving surface commences. The CPU 14 orders the optical system driver 20 to turn the mirror 17 upward and to open the shutter 18 for the duration of the set exposure time. After the completion of the exposure, the process proceeds to step S204.

At step S204, the CPU 14 changes the frequency of ΦV to the second frequency, and then the rapid discharge operation is carried out for the number of times that was set at step S201 or S202. In addition, at step S204 the signal charges generated and accumulated by the pixels 31 in step S203 are transferred to the output amplifier 34. Namely, the CPU 14 controls the TG 12 so that the vertical CCDs 32 read out the signal charges, the vertical CCDs 32 transfer the signal charges to the horizontal CCD 33 by changing the frequency of ΦV to the first frequency, and the horizontal CCD 33 transfers the signal charges to the output amplifier 34. After completion of the rapid discharge and transfer of the signal charges to the output amplifier 34, the process proceeds to step S205.

At step S205, the CPU 14 sets the number of the rapid discharge operation from the vertical CCDs 32 to one. After the number has been set, the process proceeds to step S206.

At step S206, the CPU 14 orders the TG 12 to carry out the rapid discharge operation for the number of times that was set at step S205, and to transfer the signal charges to the output amplifier 34. After completion of the rapid discharge operation and transfer of the signal charges to the output amplifier 34, the process proceeds to step S207.

At step S207, the CPU 14 determines whether or not the release button is still fully depressed. If the release button remains fully depressed, the process returns to step S200 and steps S200-S207 are repeated. If the release button does not remain fully depressed, the continuous release control terminates.

In the above embodiment, the period of the release operation is shorter than it was for the prior camera, as explained below.

In a general camera, the rapid discharge from the vertical CCDs does not commence until the exposure has been completed. After the rapid discharge operation, the signal charges are then read out from the pixels and transferred. On the other hand, in the above embodiment, the rapid discharge from the vertical CCDs is carried out at the same time as the exposure, and the period for the release operation is shortened accordingly.

In addition, in the above embodiment, the amount of photographing per a determined period can be increased because the period of the time required for one capture of an image can be shortened in the continuous photographing mode.

In the single photographing mode, the rapid discharge operation is carried out twice before transferring the signal charges from the even field. On the other hand, in the continuous photographing mode the number of the rapid discharge operation is decreased upon the capture of an image after the first capture of an image. Accordingly, the period for one capture of an image after the first capture of an image is shortened by the period for one rapid discharge operation per one capture of an image.

If the captures of an image are repeated in the single photographing operation mode, the interval between the successive captures may be long enough to allow a large amount of electrical charges to accumulate in the vertical CCDs. In order to remove a sufficient amount noise, many rapid discharge operations are necessary. On the other hand, the interval between the successive captures in the continuous photographing mode is shorter than that in the single photographing operation mode. Accordingly, electrical charges accumulated in the vertical CCDs can be sufficiently discharged even if the number of rapid discharge operations is low.

The exposure of an optical image to the image sensor and the rapid discharge are simultaneously carried out for the first capture of an image in the continuous photographing mode, in the above embodiment. However, the exposure and rapid discharge do not have to be simultaneously carried out for the first capture as long as the exposure and rapid discharge are simultaneously carried out for the captures after the first capture.

Of course, in order to increase the amount of photographing it is preferable to carry out the exposure and the rapid discharge for the first capture simultaneously. However, the period for the capture of an image can be shortened through removing the electrical charge accumulated in the vertical CCDs by partially or entirely overlapping the periods in which the exposure and the rapid discharge operations are carried out, as long as the overlap occurs by the capture after the first capture at the latest.

All the signal charges are transferred to the output amplifier 34 by twice interlace scanning, in the above embodiment. However, the number for transferring the signal charges is not limited to two, the transfer of the signal charges may be divided by three or more times. Or all the signal charges can be transferred to the output amplifier 34 at once, according to progressive scanning. If the signal charges are transferred according to progressive scanning, the same effect as the above embodiment can be achieved as long as the number of the rapid discharge operation for the first capture of an image is more than that for the captures after the first capture in the continuous photographing mode.

The rapid discharge operation is carried out twice before transferring the signal charges in the first field period for the first capture, but the rapid discharge operation is carried out once per each subsequent transfer in the above embodiment. However, the same effect as the above embodiment can be achieved as long as the number of rapid discharge operations carried out before transferring the signal charges in the first field period for the first capture is greater than that per required time in subsequent captures.

Four electrodes 36a-36d are arranged for the vertical CCDs 32 in the above embodiment. However, the number of electrodes for the vertical CCDs 32 is not limited to four. In addition, two electrodes are arranged for the horizontal CCD 33 in the above embodiment. However, the number of electrodes for the horizontal CCD 33 is not limited to two.

The image sensor 30 is a CCD image sensor in the above embodiment. However, other kinds of charge-transfer image sensors can be used.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2008-239856 (filed on Sep. 18, 2008), which is expressly incorporated herein, by reference, in its entirety.

The invention claimed is:

1. An image sensor driving unit, the image sensor driving unit driving an image sensor to carry out a capture of an image, the image sensor having a plurality of pixels and a charge-transfer channel, the pixels generating signal charges according to amounts of received light, the charge-transfer channel reading out the signal charges from the pixels and transferring the signal charges, the capture being carried out by ordering the pixels to generate the signal charges and the charge-transfer channel to transfer the signal charges, the image sensor driving unit comprising:
a first controller that orders the image sensor to carry out a rapid discharge operation before the charge-transfer channel reads out and transfers the signal charges, an electrical charge remaining in the charge-transfer channel being discharged in the rapid discharge operation;
a second controller that controls the first controller to order the image sensor to carry out the rapid discharge operation when light is made incident on the pixels for the capture after the first capture with the image sensor operating in continuous photographing mode; and
a third controller that varies a discharge number, the discharge number being the number of rapid discharge operations to be carried out, the third controller decreasing the discharge number for the capture after the first capture from the discharge number for the first capture.

2. An image sensor driving unit according to claim 1, wherein the second controller controls the first controller so that the rapid discharge operation is carried out until the incidence of light on the image sensor is completed.

3. An image sensor driving unit according to claim 1, wherein the second controller controls the first controller so that the rapid discharge operation is carried out the predetermined number of times even after the incidence of light on the image sensor is completed.

4. An image sensor driving unit according to claim 1, wherein the third controller sets the discharge number for the first capture to greater than or equal to two.

5. An image sensor driving unit according to claim 1, further comprising a fourth controller that orders the charge-transfer channel to transfer the signal charges during each divided period, a transfer period being divided into the divided periods, the signal charges generated for each capture in the continuous photographing mode being transferred during the transfer period,
wherein, the first controller ordering the image sensor to carry out the rapid discharge operation before the charge-transfer channel reads out and transfers the signal charges during each of the divided periods, and
the third controller increasing the discharge number for the rapid discharge operation carried out before the first divided period for the first capture from the discharge number for the rapid discharge operations carried out before all the divided periods for the entire capture in the continuous photographing mode.

6. An image sensor driving unit according to claim 5, wherein the third controller sets the discharge number for the rapid discharge operation carried out before the first divided period for the first capture to greater than or equal to two.

7. An image sensor driving unit according to claim 5, wherein the third controller sets the discharge number for the rapid discharge operation carried out before any of the divided periods after the first divided period to less than or equal to the discharge number for the rapid discharge carried out before the first divided period for the entire capture in the continuous photographing mode.

8. An image sensor driving unit according to claim 1, wherein the electrical charges remaining in each location of the charge-transfer channel are transferred in order from one side to the other side in the single rapid discharge operation.

9. An imaging apparatus comprising:
an image sensor that has a plurality of pixels and a charge-transfer channel, the pixels generating signal charges according to amounts of received light, the charge-transfer channel reading out the signal charges from the pixels and transferring the signal charges, the image sensor carrying out a capture of an image, the capture being carried out by ordering the pixels to generate the signal charges and the charge-transfer channel to transfer the signal charges;
a first controller that orders the image sensor to carry out a rapid discharge operation before the charge-transfer channel reads out and transfers the signal charges, an electrical charge remaining in the charge-transfer channel being discharged in the rapid discharge operation;
a second controller that controls the first controller to order the image sensor to carry out the rapid discharge operation when light is made incident on the pixels for the capture after the first capture with the image sensor operating in continuous photographing mode; and a third controller that varies a discharge number, the discharge number being the number of the rapid discharge operations to be carried out, the third controller decreasing the discharge number for the capture after the first capture from the discharge number for the first capture.

* * * * *